Figure 1:
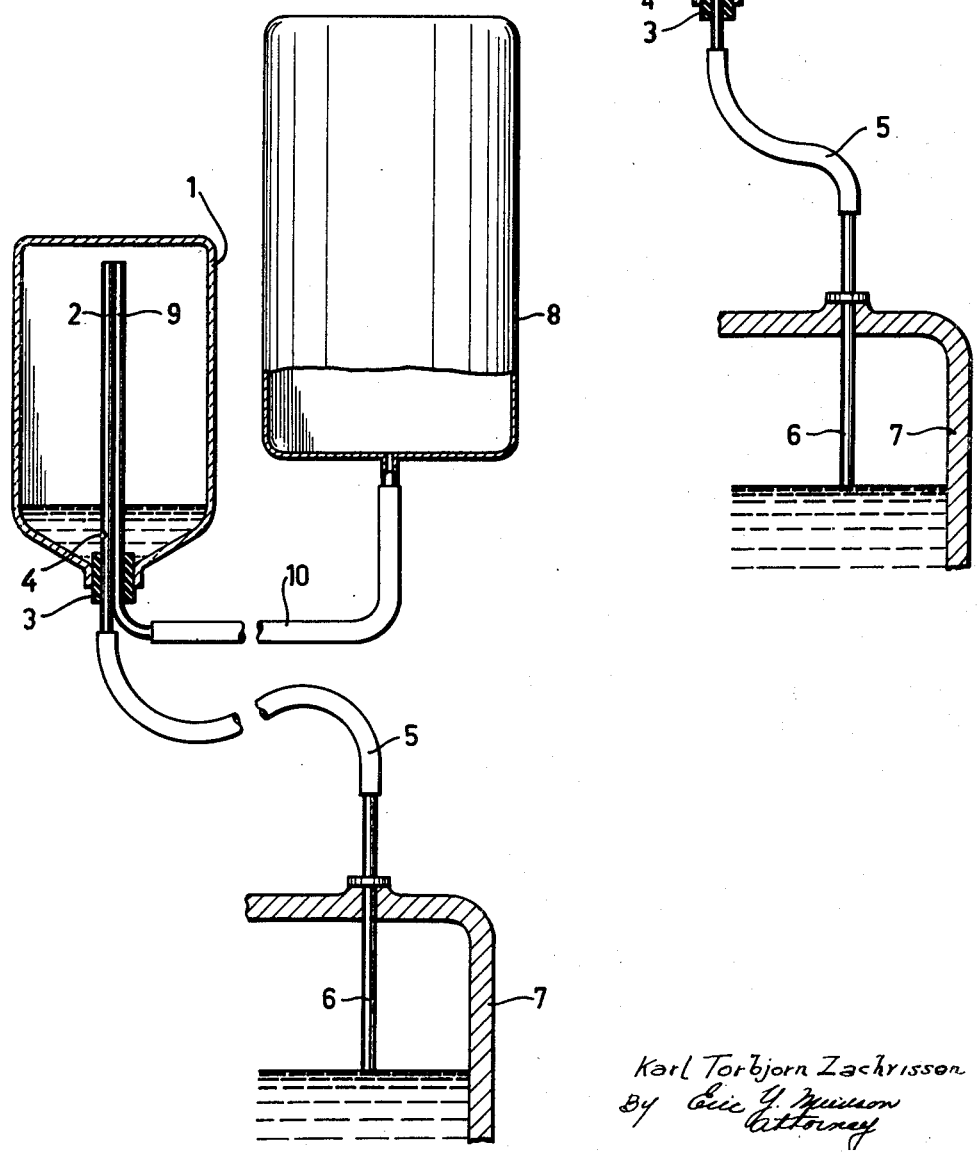

July 26, 1960

K. T. ZACHRISSON 2,946,405

APPARATUS FOR CONTROLLING THE OIL LEVEL
IN THE CRANKCASE OF A MOTOR VEHICLE
Filed Oct. 24, 1958

Karl Torbjorn Zachrisson
By Eric G. Nilsson
Attorney

United States Patent Office

2,946,405
Patented July 26, 1960

2,946,405

APPARATUS FOR CONTROLLING THE OIL LEVEL IN THE CRANKCASE OF A MOTOR VEHICLE

Karl Torbjörn Zachrisson, Fredsgatan 32, Katrineholm, Sweden

Filed Oct. 24, 1958, Ser. No. 769,360

2 Claims. (184—103)

The invention relates to an improved apparatus for controlling the oil level in the crankcase of a motor vehicle, said apparatus eliminating the need of a dipper stick the use of which is time consuming and often troublesome.

A known device for this purpose comprises a closed vessel containing oil and adapted to be mounted above the crankcase. A conduit from the bottom of this vessel is connected to the crankcase to supply oil, and another conduit from the top of the vessel is immersed in the crankcase down to the desired oil level. When the oil supply conduit is opened, oil is delivered to the crankcase until the orifice of the conduit from the top of the vessel dips below the oil level. As known, however, the oil level in the crankcase changes when the motor is running, and for this reason the oil supply conduit must normally be closed by a manually operated valve.

An object of the invention is to provide a simple and cheap apparatus by which the oil level may be adjusted and controlled entirely automatically.

The new device comprises in combination a closed vessel adapted to be mounted on the vehicle at a level above the crankcase, a pipe inserted through the bottom of the vessel and extending within the vessel almost up to its top, a conduit connected to the pipe end outside the vessel and adapted to be introduced into the crankcase to the desired oil level therein, and a narrow side opening provided on said pipe within the vessel near its bottom. Said side opening is so dimensioned that it will permit only drops of oil to pass so that a heating of the vessel causes an expulsion of oil as well as air, while on a subsequent cooling, the ensuing reduced pressure in the vessel will cause only oil to be sucked up through the conduit and connected pipe at a time when the oil level in the crankcase is too high.

The device according to the invention is easy to mount, as the conduit connected to the vessel need only be inserted through the hole provided for the dipper stick in the upper wall of the crankcase. Preferably the vessel is made of a transparent material so that the oil contained in it can be observed.

The device according to the invention and its operation will be described in more detail with reference to the accompanying drawings, in which Figures 1 and 2 show two different embodiments.

Referring to Fig. 1, the vessel consists of a glass bottle 1 adapted to be mounted upside down above the oil pan in a place heated by the motor. A pipe 2 of metal, for instance, is introduced through a plug 3 of rubber or some other sealing material inserted in the neck of the bottle and extends with its upper end close to the upturned bottom of the bottle. Within the bottle somewhat above the plug the pipe is provided with a narrow side opening 4 the diameter of which may be about .5 mm., preferably not more than 1 mm.

The lower end of the pipe 2 outside the bottle is connected by means of a flexible hose 5 to a second pipe 6 which is inserted through the hole provided for the dipper stick in the crankcase or the oil pan 7. A flange provided on the pipe 6 ensures that the lower end of the pipe 6 is held at the desired oil level. Of course, the outside diameter of the pipe 6 must be dimensioned with regard to the size of the dipper stick opening, generally 7–8 mm. diameter, but within this range the dimensions are not particularly critical. Thus, an inner diameter of the conduit 2, 5, 6 of approximately 2 mm. has proved quite sufficient.

When using the device described, the oil pan is generally filled with oil to some excess. It is assumed that the bottle 1 is initially empty. When the motor is started and permitted to run for some time, the bottle is heated so that the air contained therein is partly expelled. The cooling following the stopping of the motor causes an underpressure in the bottle, and because the lower end of the pipe 6 is below the oil level in the crankcase only oil is sucked up. The next time the motor is started oil as well as air is expelled through the conduit 2, 5, 6 into the crankcase, in that drops of oil forced through the restricted opening 4 are mixed with air supplied through the open upper end of the pipe 2. As said pipe 2 extends substantially to the top of the bottle, its upper end will always be located above the oil in the bottle. Possibly the whole excesive amount of oil is not sucked into the bottle on one start of the motor, but as the amount of oil sucked up on cooling is always greater than that expelled at the next start, as long as the pipe 6 reaches into the oil, generally only a few starts are needed to achieve a state of equilibrium in which the lower end of the pipe is located at the desired oil level in the crankcase, while the bottle contains the whole excess of oil. If the motor does not consume any oil, the amount of oil expelled on each start of the motor will then be equal to that sucked up on cooling, which may be observed through the transparent bottle. If some oil is consumed, the amount of oil supplied from the bottle at the next start of the motor is required wholly or partly for restoring the desired oil level, and at the following stopping of the motor a correspondingly smaller amount of oil is consequently returned to the bottle, as only air is sucked in as soon as the pipe 6 no more dips into the oil in the crankcase. A refilling of oil, which is done in the common way, is only required when the bottle is empty of oil.

By means of the device described it is also easy to observe the degree of pollution of the oil to determine if a change of oil is needed.

Figure 2 shows an embodiment in which the upper portion of a bottle 1 arranged in the same way as before is connected to a second closed container 8 by means of a conduit. This conduit may consist of a pipe 9 inserted through the plug 3 and a flexible hose 10 connected thereto. Within the bottle 1 the pipe 9 extends to the same height as the pipe 2 so that no oil enters the container 8. If desired, however, a suitable container 1 may instead have an outlet at its top to be connected to the hose 10.

When using this embodiment it is possible to mount the oil container 1 in a place visible from the driver's seat, while the container 8 is placed in a warm place under the motor hood, for instance at the inside of the radiator. For the rest, the operation of the device is exactly the same as in the embodiment according to Fig. 1. Primarily, the embodiment according to Fig. 2 should be useful in buses and large trucks, where neither lack of space nor esthetic points of view present obstacles to the mounting of the oil container as described. The container 8 need not be made of transparent material; it may to advantage be made of sheet metal with good heat conductivity.

What I claim is:

1. An apparatus for controlling the oil level in the crankcase of a motor vehicle comprising, a closed vessel mounted at a level above the crankcase in a position to be heated when the motor is in operation, a pipe inserted through the bottom of the vessel and extending within the vessel to a point close to the top of the vessel, a conduit having one end connected to the pipe end outside of the vessel, said conduit having its other end introduced into the crankcase to the desired oil level therein, said pipe being provided with a side opening in it and located within the vessel near the bottom of the vessel, said side opening having a cross sectional area constituting only a fraction of the inner cross sectional area of said pipe and being dimensioned to permit only drops of oil to pass, whereby a heating of the vessel causes an expulsion of air as well as oil down through the pipe and conduit connected thereto, while on a subsequent cooling, the ensuing reduced pressure in the vessel will cause only oil to be sucked up through the conduit and connected pipe at a time when the oil level in the crankcase is too high.

2. An apparatus for controlling the oil level in the crankcase of a motor vehicle comprising, a closed vessel mounted above the crankcase in a desired place on the vehicle, a pipe inserted through the bottom of the vessel and extending within the vessel to a point adjacent to its top, a conduit having one end connected to the pipe end outside the vessel and having its other end introduced into the crankcase to the desired oil level therein, said pipe having a side opening located within the vessel near the bottom of the vessel, said side opening having a cross sectional area constituting only a fraction of the inner cross sectional area of said pipe and being dimensioned to permit only drops of oil to pass through it, a second closed vessel mounted in a location where it is heated when the motor is in operation, and a conduit connecting the top of the first vessel with the second vessel whereby a heating of said second vessel causes an expulsion of oil as well as air from the first vessel into the crankcase, while on a subsequent cooling, the ensuing reduced pressure in said connected vessels will cause only oil to be sucked up into the first vessel at a time when the oil level in the crankcase is too high.

References Cited in the file of this patent

UNITED STATES PATENTS

| | | |
|---|---|---|
| 1,071,894 | Doss | Sept. 2, 1913 |
| 1,312,365 | Shattuck | Aug. 5, 1919 |
| 1,664,510 | Hughes | Apr. 3, 1928 |
| 2,071,929 | Harter | Feb. 23, 1937 |
| 2,564,230 | Pitney | Aug. 14, 1951 |
| 2,565,010 | Warner | Aug. 21, 1951 |